April 28, 1936.  J. L. BILLMAN  2,039,208
DRAIN FOR AUTOMOBILE WINDOWS
Filed April 10, 1935
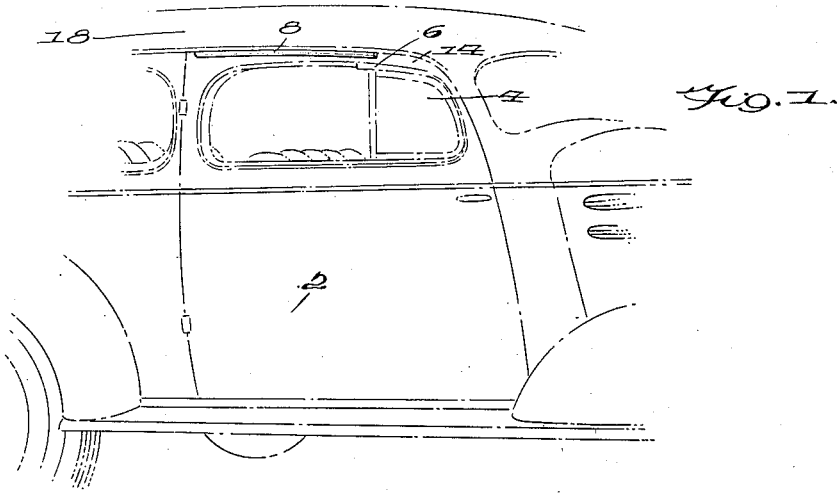
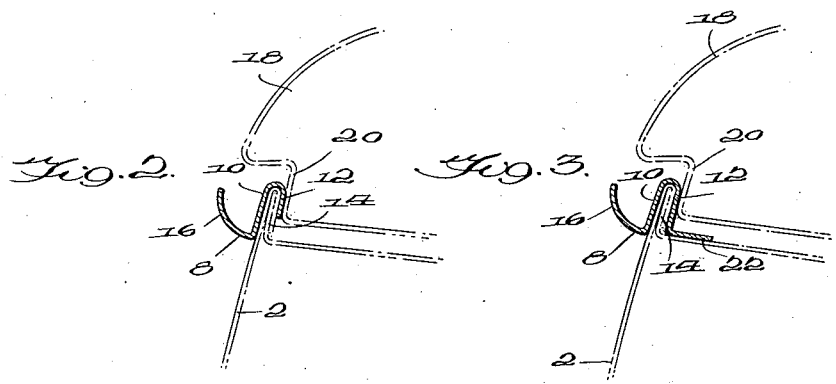
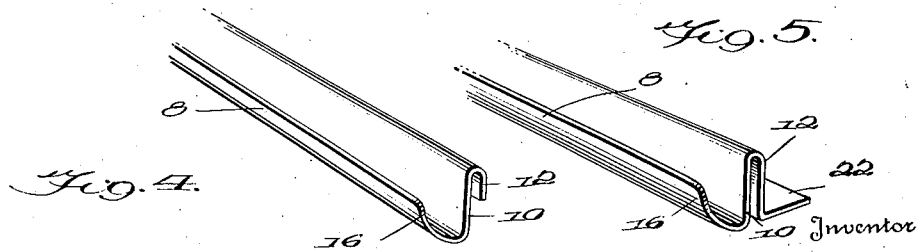

Patented Apr. 28, 1936

2,039,208

UNITED STATES PATENT OFFICE 2,039,208

DRAIN FOR AUTOMOBILE WINDOWS

John Lawrence Billman, Washington, D. C.

Application April 10, 1935, Serial No. 15,653

3 Claims. (Cl. 296—44)

My invention relates to an improvement in drains for automobile windows.

Modern automobile designing has changed considerably in the development of streamline bodies, and the designers have omitted the drain gutter which formerly was affixed to the top above the windows and doors. By omitting this gutter, the design of the automobile has been changed considerably, but it has been found that in many cases water flowing from the roof of an automobile will drip down over the window and enter the car if the window is open.

The window next to the operator of an automobile should at all times be open so that the operator may give proper signals and indicate whether he is about to turn or stop. It has been found that water will drain off of the roof to the decided disadvantage of the automobile operator. An object of my invention is to provide a drain gutter which may be attached to the door of an automobile to catch water dripping from the top and stop it from entering an open window.

A further object of my invention is to provide a gutter for automobile windows which may be readily shaped to fit any automobile door.

A further object of my invention is to provide a gutter which may be either permanently fixed to an automobile door or may be removed when desired.

In the accompanying drawing:

Fig. 1 is a partly broken away perspective of a modern automobile showing my drain in position over a door;

Fig. 2 is a cross-section through the top and door of an automobile showing my drain in position;

Fig. 3 is a cross-section of an automobile top and door showing a modified form of my drain;

Fig. 4 is an enlarged perspective view of the drain shown in Fig. 2; and

Fig. 5 is an enlarged perspective view of the drain shown in Fig. 3.

The automobile door 2 is representative of doors of modern automobiles, having a part of the window therein which is slidable vertically within the frame, and a ventilating window 4 which is pivotally mounted so that the forward portion thereof turns inwardly while the rear portion thereof turns outwardly with respect to the inside of the automobile.

Some makes of modern automobiles utilizing a ventilating window 4 are provided with a small drain 6, which is approximately triangular in shape looking from the roof of the automobile downwardly, so that this window may be kept open and the drain 6 will keep water from flowing off of the roof into the interior of the automobile.

My drain 8 is made of relatively thin metal or other material, and is in substantially the form shown in Figs. 2 and 4.

The straight edge portion 10 is adapted to be placed against the upper edge of the automobile door 2 and held in position there by means of the folded-over portion 12 which fits over the upstanding edge 14 of the door 2. From the side of the straight edge 10 remote from the folded over portion 12, I provide an upwardly curved portion 16 which bends outwardly away from the automobile door 2, a sufficient distance so that any water draining from the automobile top 18 will drip into the gutter formed between the outwardly bent portion 16 and the straight edge 10 of the drain, and thus will not pass downwardly over the window and into the interior of the automobile if the window is open.

Many automobile doors are provided with rubber bumpers which are attached to the upper part of the door and the upstanding edge 14 and are adjusted to abut against the portion 20 of the top when the door is closed. The form of drain which I have disclosed in Figs. 2 and 4 is particularly designed to be used on cars which utilize a rubber bumper between the upstanding edge 14 of the door and the lower portion 20 of the top, the folded over portion 12 being adapted to be inserted between the upstanding edge 14 of the car door and the rubber bumper which is mounted thereon. This form of a drain may also be used on automobiles which are not provided with a rubber bumper and may be attached to an automobile having no such bumper as disclosed in Fig. 2. The straight portion 10 of the drain and the downwardly curved edge 12 thereof provide a recess which is adapted to fit over tightly an upstanding edge 14 of any automobile door, and thereby hold the drain securely in position to receive water dripping from the top 18.

In the modified form of drain which is disclosed in Figs. 3 and 5, I provide an extended foot portion 22 to the downwardly extending edge 12. This foot 22 extends downwardly a sufficient distance to abut against the upper side of the car door 2 to which it may be soldered, welded, or fastened in any suitable manner. Ordinarily, it is not necessary to use this form of drain because the drain is adapted to fit snugly to the upstanding portion 14 of the car door as described above, and be maintained in its adjusted position by its frictional engagement with the upstanding edge 14 of the door.

While, as disclosed in the drawing, my drain appears to be of the same thickness or even thicker than the metal sheath of the automobile door, it is to be understood that the drain will be made of a thinner metal than the metal used in an automobile. The disclosure in the drawing shows the drain of a thicker material merely to clearly illustrate its construction and use.

While Fig. 1 discloses one design of a modern automobile, it will be understood that my drain is adapted to be used on automobiles of varying designs. The automobile disclosed in Fig. 1 has only one door on each side and the upper edge of that door is practically straight.

Many modern automobiles have doors of widely varying shapes, many of which are considerably rounded on their upper edge. By virtue of the fact that my drain is made of comparatively thin metal, it will be understood that it may be readily bent to fit properly over the top of any automobile door.

In Fig. 1, I have disclosed an automobile door which utilizes a ventilating window and a small drain 6 thereover. It will be understood that some automobiles do not utilize this drain 6, and, therefore, it will be necessary to provide a section of my drain sufficiently long to cover the entire window.

It will be understood that minor changes may be made from time to time in construction of my automobile door drain without departing from the spirit of the invention and the scope of the appended claims.

I claim:

1. In a drain for an automobile door, a gutter, one edge of said gutter folded over upon itself, and means to engage the inside edge of the door overlap flange for securing said gutter to the upper edge of the automobile door.

2. In a drain for an automobile door, a flat portion to engage the outer edge of the door, a folded over edge forming a space between said flat portion and said edge, and an upwardly folded edge forming a gutter, the space between the said flat portion and the folded over edge adapted to engage the overlap flange on the upper edge of the automobile door.

3. In a drain for an automobile door, a flat portion to engage the upper and outer edge of the door, an edge of said drain folded over and spaced apart from said flat portion, and the edge remote from said folded over edge folded over upon the said flat portion to form a gutter, said first-mentioned folded over portion adapted to engage the overlap flange on the upper edge of the door.

JOHN L. BILLMAN.